(12) United States Patent
Yamada et al.

(10) Patent No.: US 9,283,870 B2
(45) Date of Patent: Mar. 15, 2016

(54) SEAT SLIDING DEVICE FOR VEHICLE

(75) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 102 days.

(21) Appl. No.: 14/131,334

(22) PCT Filed: Jun. 27, 2012

(86) PCT No.: PCT/JP2012/066426
§ 371 (c)(1),
(2), (4) Date: Jan. 7, 2014

(87) PCT Pub. No.: WO2013/008629
PCT Pub. Date: Jan. 17, 2013

(65) Prior Publication Data
US 2014/0138510 A1 May 22, 2014

(30) Foreign Application Priority Data
Jul. 12, 2011 (JP) .................................. 2011-154132

(51) Int. Cl.
*F16M 11/38* (2006.01)
*B60N 2/08* (2006.01)
*B60N 2/07* (2006.01)

(52) U.S. Cl.
CPC ............ *B60N 2/0837* (2013.01); *B60N 2/0705* (2013.01); *B60N 2/0727* (2013.01); *B60N 2/0818* (2013.01); *B60N 2/0875* (2013.01)

(58) Field of Classification Search
CPC ...... B60N 2/08; B60N 2/0812; B60N 2/0818; B60N 2/085; B60N 2/0831; B60N 2/0837; B60N 2/0881; B60N 2/0887; B60N 2/07; B60N 2/0715; B60N 2/0727; B60N 2/0875; B60N 2/0705
See application file for complete search history.

(56) References Cited

U.S. PATENT DOCUMENTS 6,089,521 A * 7/2000 Tarusawa ............. B60N 2/0705 248/430
7,717,392 B2 5/2010 Sakakibara et al.
(Continued)

FOREIGN PATENT DOCUMENTS

EP 2 141 045 A1 1/2010
EP 2 676 835 A2 12/2013
(Continued)

OTHER PUBLICATIONS

International Preliminary Report on Patentability and Written Opinion issued on Jan. 14, 2014, in PCT/JP2012/066426 filed Jun. 27, 2012.
(Continued)

*Primary Examiner* — Christopher Garft
(74) *Attorney, Agent, or Firm* — Oblon, McClelland, Maier & Neustadt, L.L.P.

(57) ABSTRACT

A seat sliding device for a vehicle includes a first rail, which is adapted to be fixed to one of a vehicle floor and a seat and a second rail, which is adapted to be fixed to the other one of the vehicle floor and the seat and coupled to the first rail to make relative movement with respect to the first rail. An urging member is provided with a latch part, which is latched to a second coupling wall part and a latch end part, which is latched to a lock lever. The urging member generates in association with bending deformation an urging force which urges the lock lever in a vertical direction toward a direction in which the lock lever engages with the first rail. The urging member has a coil part wound about a rotating shaft between the latch part and the latch end part.

11 Claims, 7 Drawing Sheets

(56) References Cited

U.S. PATENT DOCUMENTS

| | | | |
|---|---|---|---|
| 8,033,520 B2 | 10/2011 | Fujieda et al. | |
| 2009/0080814 A1* | 3/2009 | Kojima | B60N 2/0727 384/34 |
| 2010/0133407 A1* | 6/2010 | Fujieda | B60N 2/0727 248/429 |

FOREIGN PATENT DOCUMENTS

| EP | 2 733 013 A1 | 5/2014 |
|---|---|---|
| JP | 58 19836 | 2/1983 |
| JP | 2001 187540 | 7/2001 |
| JP | 2008 254599 | 10/2008 |
| JP | 4355963 | 11/2009 |

OTHER PUBLICATIONS

International Search Report Issued Jul. 31, 2012 in PCT/JP12/066426 Filed Jun. 27, 2012.

U.S. Appl. No. 14/131,350, filed Jan. 7, 2014, Yamada et al.

Extended European Search Report issued Jan. 30, 2015 in Patent Application No. 12811993.0.

* cited by examiner

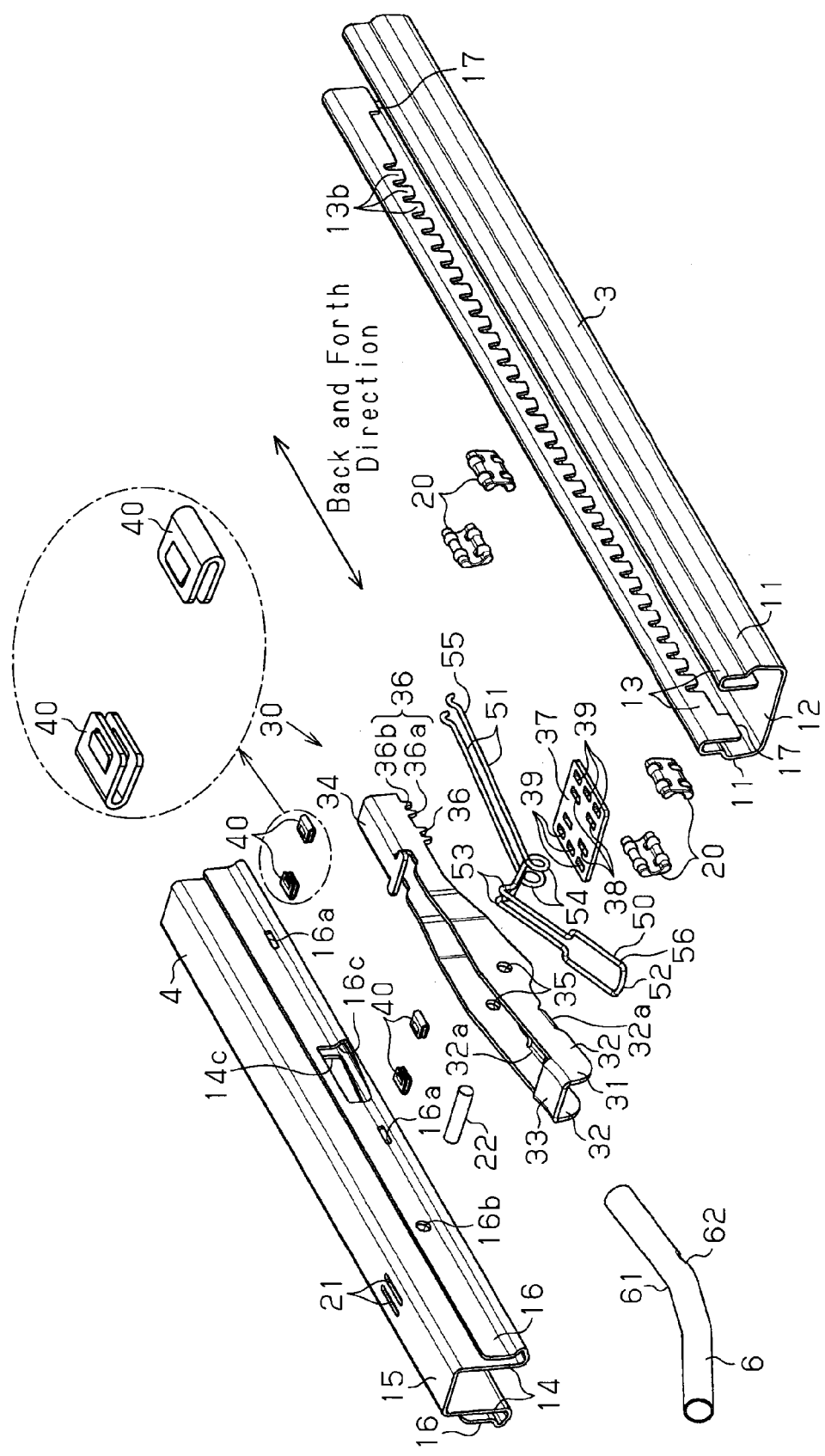

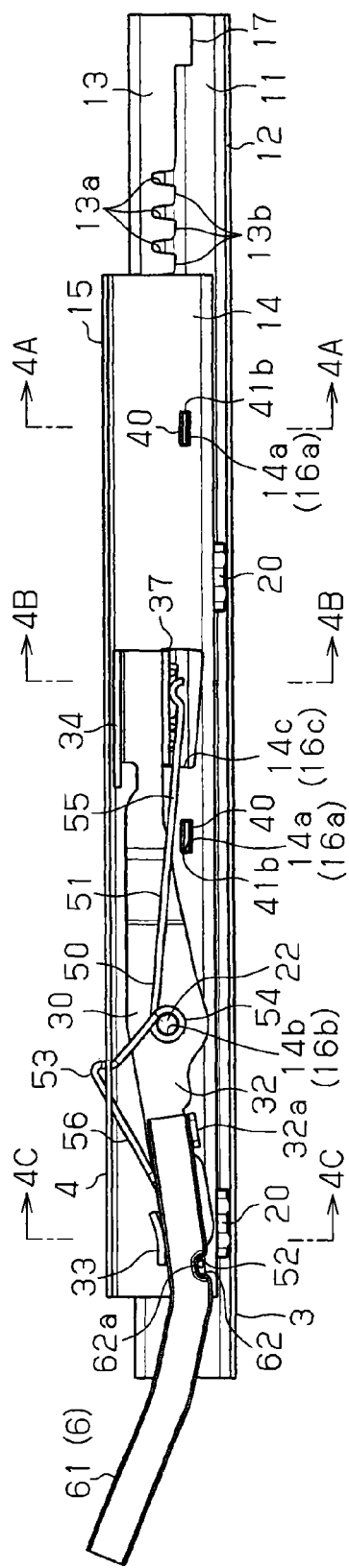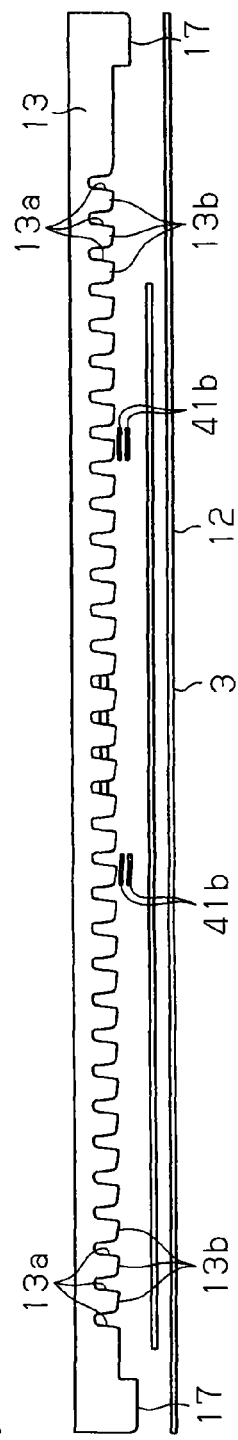

SEAT SLIDING DEVICE FOR VEHICLE

FIELD OF THE INVENTION

The present invention relates to a seat sliding device for a vehicle, which is to adjust the relative position between a vehicle floor and a seat.

BACKGROUND OF THE INVENTION

There have been so far proposed various types of a seat sliding device for a vehicle. For example, a seat sliding device for a vehicle disclosed in Patent Document 1 is provided with a lower rail which has an opening that is opened upward, the cross section of which is substantially U-shaped, and an upper rail which blocks the opening, the cross section of which is substantially U-shaped. The lower rail engages with the upper rail to slide with each other in a longitudinal direction. And, a lock lever is supported on the upper rail.

That is, the lock lever is provided with a rivet arranged inside a U-shaped cross section of an attachment part of the lock lever and a spring pin, which penetrates through the attachment part, and also the rivet in a widthwise direction. The rivet is crimped and joined to a top plate of the upper rail, by which the lock lever is coupled to the upper rail to rotationally move about the spring pin.

The lock lever is integrally provided with a latch part which is capable of entering into notches formed at a lower part of the upper rail in association with rotational movement about the spring pin. The latch part spreads substantially all over the upper rail in the widthwise direction thereof. Then, a lock hole into which a latched part that is formed on the lower rail can be fitted in association with the rotational movement of the lock lever about the spring pin is formed at the latch part.

The lock lever is connected to an operating lever which is inserted from a distal end part of the upper rail. Further, a lock spring composed of blade springs is provided with one end part which is held between the top plate of the upper rail and the rivet. The lock lever is pressure-contacted by the other end part of the lock spring and thereby constantly urged in a direction in which the latch part of the lock lever enters into the notches of the upper rail and also in a direction in which the latched part of the lower rail is fitted into the lock hole.

Therefore, the lock lever is urged by the lock spring to rotationally move, the latch part thereof enters into the notches of the upper rail and the latched part of the lower rail is also fitted into the lock hole. Thereby, restrictions are placed on movement of the upper rail which supports the lock lever with respect to the lower rail. Accordingly, restrictions are placed on movement of a seat with respect to a vehicle floor in the longitudinal direction of the rails. In other words, the seat is locked.

On the other hand, a release operation force is input from the operating lever. Thereby, when the lock lever rotationally moves against an urging force of the lock spring in a direction in which the latch part of the lock lever is detached from the notches of the upper rail and also in a direction in which the latched part of the lower rail is detached from the lock hole, restrictions on movement of the upper rail with respect to the lower rail are released. Thereby, the seat is allowed to move to the vehicle floor in the longitudinal direction of the rails. In other words, the seat is unlocked.

As so far described, it is possible to adjust and retain the seat at such a required position, at which a passenger sits favorably.

Further, for example, a seat sliding device for a vehicle disclosed in Patent Document 2 is provided with a lower rail which has a flange part and an upper rail which holds the flange part. A cut is formed at a top plate part near both ends of the upper rail and a cut-out part is also formed at each end of an inner edge of the flange part of the lower rail. In the above-described structure, when the lower rail and the upper rail are assembled, the cut of the upper rail is folded inward after insertion of the lower rail into the upper rail to form a folded part. Then, on movement of the upper rail with respect to the lower rail, the folded part of the upper rail is brought into contact with and latched to a step which is formed by the cut-out part of the lower rail. Thereby, a distance of relative movement between the lower rail and the upper rail is restricted within a predetermined range.

PRIOR ART DOCUMENTS

Patent Documents

Patent Document 1: Japanese Patent No. 4355963
Patent Document 2: Japanese Utility Model Publication No. 58-19836

SUMMARY OF THE INVENTION

Regarding the lock spring composed of blade springs for urging the lock lever, the distal end part of the lock spring is fixed to the upper rail, that is, the top plate at a position of a rotating shaft of the lock lever, that is, at a position of the rivet. That is, the lock spring is such that at least an end part which serves as a fixed end thereof is restricted to a position of the rotating shaft of the lock lever. Due to the above restriction, there may be found a case where length of the lock spring in relation to a spring constant of the lock spring on bending deformation (effective length) is not sufficiently secured. In this case, the spring constant is required to be increased due to a decrease in length of the lock spring. In association with the decrease, for example, an increase in operating force required for releasing the operating lever may deteriorate the operation performance of the lever.

On the other hand, in Patent Document 2, the folded part of the upper rail restricts relative movement between the lower rail and the upper rail, while supporting them in a cantilever state. Therefore, the folded part is required to increase, for example, the thickness of the upper rail.

Thus, as shown in FIG. 8(a) and FIG. 8(b), there is proposed a seat sliding device for a vehicle which is provided with a lower rail 91 having a pair of side wall parts 91a arranged in the widthwise direction in parallel, the cross section of which is substantially C-shaped, and an upper rail 92, which is attached inside the lower rail 91 and is able to move relatively with respect to the lower rail 91. In this case, both end parts of a lock pin 93, which bridges the lower rail 91 in the widthwise direction to cut across a movement orbit of a distal end surface 92a of the upper rail 92, are individually joined to the side wall parts 91a. Therefore, when the upper rail 92 moves to the lower rail 91, the distal end surface 92a of the upper rail 92 is brought into contact with and latched to the lock pin 93, by which a distance of relative movement between the lower rail 91 and the upper rail 92 is restricted within a predetermined range. Since the lock pin 93 restricts movement of the upper rail 92 while supporting the lower rail 91 on both sides, strength can be sufficiently secured.

However, in the above-described structure, a range of restricting the distance of relative movement between the lower rail 91 and the upper rail 92 is determined by a distance between the distal end surface 92a and the lock pin 93 in a direction in which the upper rail 92 moves, that is, the length of the upper rail 92 in this direction, for example, where the lock pin 93 on the lower rail 91 is fixed to a certain position. In other words, when the upper rail 92 which is attached to the lower rail 91 is changed in length, this lower rail 91 also undergoes an automatic change in a range of restricting the distance of relative movement between the lower rail 91 and the upper rail 92. As a result, there is a significant decrease in degree of freedom in terms of adjusting a range of restricting the distance of relative movement between the lower rail 91 and the upper rail 92.

An object of the present invention is to provide a seat sliding device for a vehicle which is capable of decreasing restrictions on an arrangement space and also suppressing an increase in operating force required for disengaging a lock lever from a rail.

Another object of the present invention is to provide a seat sliding device for a vehicle which is capable of more securely restricting relative movement between rails without a decrease in degree of freedom in terms of adjusting a range of restricting a distance of relative movement between the rails.

In order to attain the above objects, a first aspect of the present invention provides a seat sliding device for a vehicle including a first rail, a second rail, a rotating shaft, a lock lever, and an urging member. The first rail is adapted to be fixed to one of a vehicle floor and a seat. The second rail is adapted to be fixed to the other one of the vehicle floor and the seat and coupled to the first rail to make a relative movement with respect to the first rail. The second rail has a pair of side wall parts arranged in a widthwise direction in parallel and a coupling wall part, which couples base ends of the side wall parts in which the base ends of the side wall parts are spaced away from the first rail. The rotating shaft has an axis extending in the widthwise direction and which bridges the side wall parts. The lock lever has a pair of vertical wall parts that are arranged in parallel between the side wall parts in the widthwise direction and through which the rotating shaft penetrates. The lock lever rotationally moves about the axis in one direction to engage with the first rail, thereby restricting relative movement between the first rail and the second rail and rotationally moves about the axis in the other direction to release the engagement with the first rail, thereby releasing restrictions on the relative movement. The urging member has a latch part latched to the coupling wall part and a latch end part latched to the lock lever. The urging member generates in association with bending deformation an urging force that urges the lock lever in a vertical direction in which the lock lever engages with the first rail. The urging member has a coil part, which is wound about the rotating shaft between the latch part and the latch end part.

A second aspect of the present invention provides a seat sliding device for a vehicle which is arranged on a vehicle having a floor and a seat. The seat sliding device for a vehicle includes a first rail, a second rail, a rotating shaft, a lock lever, and an urging member. The first rail is adapted to be fixed to one of the floor and the seat. The second rail is adapted to be fixed to the other one of the floor and the seat and coupled to the first rail to make relative movement with respect to the first rail. The second rail has a pair of first supporting parts arranged in parallel in a widthwise direction of the vehicle and a coupling part, which couples the base ends of the pair of first supporting parts in which the base ends of the pair of first supporting parts are spaced away from the first rail. The rotating shaft has an axis extending in the widthwise direction of the vehicle and is supported between the first supporting parts to rotate. The lock lever has a pair of second supporting parts that are arranged in parallel between the first supporting parts in the widthwise direction of the vehicle and through which the rotating shaft penetrates. The urging member has a latch part latched to the coupling wall part, a latch end part latched to the lock lever, and a coil part wound about the rotating shaft between the latch part and the latch end part, thereby generating in association with bending deformation an urging force for urging the lock lever in a vertical direction of the vehicle so that the lock lever engages with the first rail. When the lock lever rotates about the axis in one direction, the lock lever engages with the first rail to prevent relative movement between the first rail and the second rail, and when the lock lever rotates about the axis in the other direction, the first rail is released from the engagement with the lock lever, thereby allowing the relative movement.

A third aspect of the present invention provides a seat sliding device for a vehicle which is installed on a vehicle having a floor and a seat. The seat sliding device for a vehicle includes a first rail, a second rail, and a latch member. The first rail is adapted to be fixed to one of the floor and the seat. The second rail is adapted to be fixed to the other one of the floor and the seat and coupled to the first rail to make relative movement with respect to the first rail. The first rail is provided with a pair of first side wall parts arranged in a widthwise direction in parallel, two first folded wall parts, which individually extend inward in the widthwise direction facing each other from distal ends of the first side wall parts and folded toward the base ends of the first side wall parts, and a restriction part further extending from distal end of the first folded wall part at a predetermined position of the first rail in the longitudinal direction. The second rail is provided with a pair of second side wall parts arranged in parallel between the first side wall parts in the widthwise direction, two second folded wall parts extending individually outward in the widthwise direction mutually spaced away from distal ends of the second side wall parts and folded to be enclosed with the first side wall parts and the first folded wall parts, and a side wall part attachment hole and a folded wall part attachment hole, which are formed to respectively face in the widthwise direction the second side wall parts and the second folded wall parts are adjacent at a predetermined position of the second rail in the longitudinal direction. The latch member is inserted into the side wall part attachment hole and the folded wall part attachment hole to bridge the second side wall parts and the second folded wall parts in the widthwise direction, opens a movement orbit of the first folded wall part in a direction in which the first rail and the second rail make relative movement, and cuts across a movement orbit of the restriction part.

According to each of the above-described aspects, the lock lever is urged in the vertical direction to engage with the first rail by an urging force in association with bending deformation of the urging member. In this case, the effective length of the urging member in relation to a spring constant on bending deformation is determined by a length between a latch position to the coupling wall part (latch part) and the rotating shaft, a length between a lock position to the lock lever (latch end part) and the rotating shaft, and a length of the coil part. It is, therefore, possible to decrease a spring constant of the urging member on bending deformation only by the length of the coil part. Thereby, even if an end part of the urging member is not extended unnecessarily long from the rotating shaft to the coupling wall part, it is possible to decrease the spring constant of the urging member on bending deformation. Then, it is possible to suppress an increase in operating force required for disengaging the lock lever from the first rail, with restrictions on an arrangement space being decreased.

BRIEF DESCRIPTION OF THE DRAWINGS

FIG. 2 is an exploded perspective view which shows the seat sliding device in FIG. 1.

FIG. 2 (a) is an enlarge part of FIG. 2.

FIG. 3(a) is a longitudinal sectional view which shows the same embodiment.

FIG. 3(b) is a longitudinal sectional view which shows the same embodiment.

FIG. 4(c) is a sectional view respectively along the line 4C-4C in

FIG. 3(a).

DETAILED DESCRIPTION OF THE PREFERRED EMBODIMENTS

Figure 1:
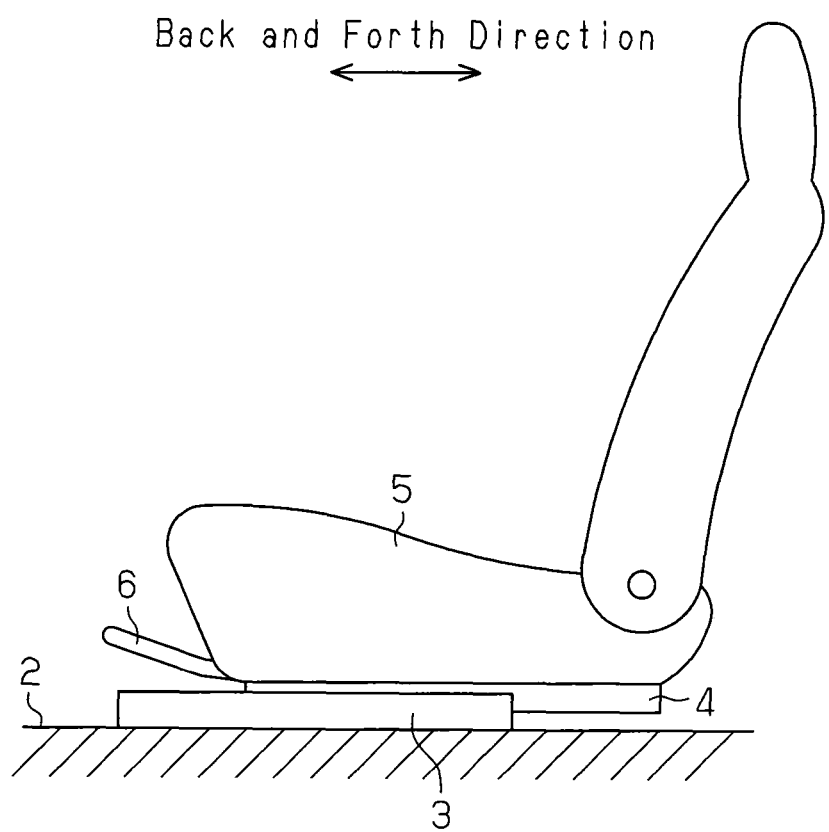
FIG. 1 is a side view which shows a seat sliding device and a seat for a vehicle in the present invention.

A description will be given of one embodiment of the present invention with reference to FIG. 1 to FIG. 7. As shown in FIG. 1, a lower rail 3 as a first rail is fixed on a vehicle floor 2 in such a manner to extend in the back and forth direction of a vehicle. An upper rail 4 as a second rail is attached to the lower rail 3 to make relative movement with respect to the lower rail 3 in the back and forth direction.

A pair of the lower rail 3 and the upper rail 4 shown in FIG. 1 is one of two pairs placed in the widthwise direction of the vehicle (a direction orthogonal to the space in FIG. 1), with an interval therebetween. In this case, there is shown the pair arranged on the left side with respect to the front. A seat 5 on which a passenger sits is fixed and supported on the upper rails 4. Normally, relative movement of the upper rail 4 with respect to the lower rail 3 is kept restricted in principle. There is arranged a release handle 6 which releases the restricted state.

As shown in FIG. 2, the lower rail 3 is provided with a pair of first side wall parts 11, which are composed of plate members and vertically extend to both sides in the widthwise direction and a first coupling wall part 12, which couples the base ends of the first side wall parts 11, that is, both lower ends. A first folded wall part 13 which extends internally in the widthwise direction and is folded toward the base end of each of the first side wall parts 11 is formed at a distal end of each of the first side wall parts 11, that is, at an upper end thereof, to continue to the first side wall part 11.

Figure 4A:
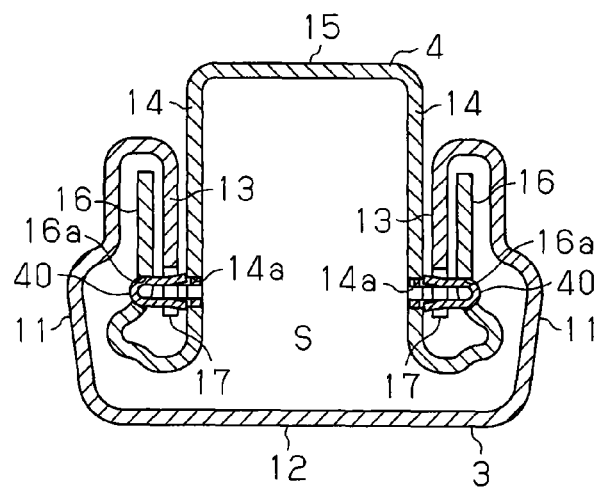
FIG. 4(a) is a sectional view along the line 4A-4A in FIG. 3(a).
Figure 4B:
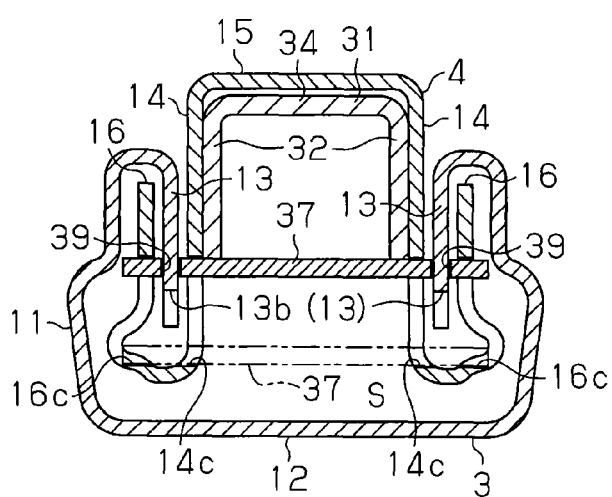
FIG. 4(b) is a sectional view respectively along the line 4B-4B in FIG. 3(a).
Figure 4C:
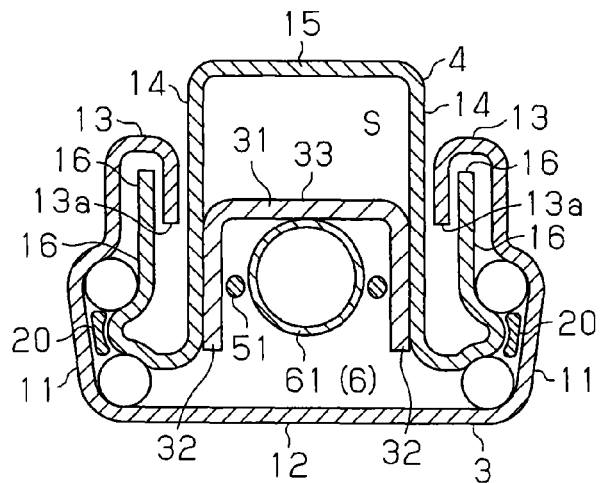

The upper rail 4 is provided with second side wall parts 14 (first supporting parts) as a pair of side wall parts which are composed of plate members and vertically extend between the first folded wall parts 13 of the lower rail 3 and a second coupling wall part 15 (coupling part) as a coupling wall part that couples the base ends of the second side wall parts 14 in which the base ends of the second side wall parts 14 are spaced away from the lower rail 3, that is, both upper ends thereof, as shown together in FIG. 4(a) to FIG. 4(c). Then, a second folded wall part 16 which extends outward in the widthwise direction and is folded to be enclosed by the first side wall part 11, and the first folded wall part 13 is formed at a distal end of each of the second side wall parts 14, that is, at a lower end thereof, in such a manner to continue to the second side wall part 14.

That is, each of the lower rail 3 and the upper rail 4 is provided with a substantially U-shaped cross section, and these rails are butted together so that their opening parts face each other. The rails are prevented from being detached in the vertical direction mainly by engagement between the first folded wall parts 13 and the second folded wall parts 16. The lower rail 3 and the upper rail 4 configure a rail cross section which assumes substantially a rectangular box shape. The lower rail 3 configures an inner space S together with the upper rail 4.

As shown in FIG. 3(a) and FIG. 4(c), a pair of rolling members 20 are attached in the back and forth direction between each of the second folded wall parts 16 and each of the first side wall parts 11 which faces thereto. The upper rail 4 is supported to be slidable with respect to the lower rail 3 in the longitudinal direction (in the back and forth direction) in such a manner that the rolling members 20 are rolled between the upper rail 4 and the lower rail 3.

As shown in FIG. 3(a) and FIG. 3(b), a plurality of notches 13a extending upward from the distal end of the lower rail 3, that is, from the lower end thereof, are formed at an intermediate part of each of the first folded wall parts 13 of the lower rail 3 in the longitudinal direction, with a predetermined interval kept therebetween in the longitudinal direction. Rectangular tooth-like lock pawls 13b are individually formed between adjacent notches 13a. Thus, the plurality of lock pawls 13b are arranged in parallel in the longitudinal direction of the lower rail 3, with the above-described predetermined interval kept therebetween. Also, a restriction part 17 extending further downward in a stepwise manner from the distal end of the first folded wall part 13, that is, from the lower end thereof, is formed at each end of the first folded wall parts 13 of the lower rail 3 in the longitudinal direction. As a matter of course, all the plurality of lock pawls 13b are arranged to be held between the restriction parts 17 of the lower rail 3 (first folded wall parts 13) in the longitudinal direction.

Two side wall part attachment holes 14a are formed at an intermediate part of each of the second side wall parts 14 of the upper rail 4 in the longitudinal direction, with an interval therebetween in this direction. Further, as also shown in FIG. 4(a), a folded wall part attachment hole 16a is formed at each of the second folded wall parts 16 of the upper rail 4 to face each of the side wall part attachment holes 14a in the widthwise direction. The side wall part attachment hole 14a and the folded wall part attachment hole 16a are arranged in the vertical direction between the lower end of the first folded wall part 13 (lock pawl 13b) and the lower end of the restriction part 17.

Figure 7:
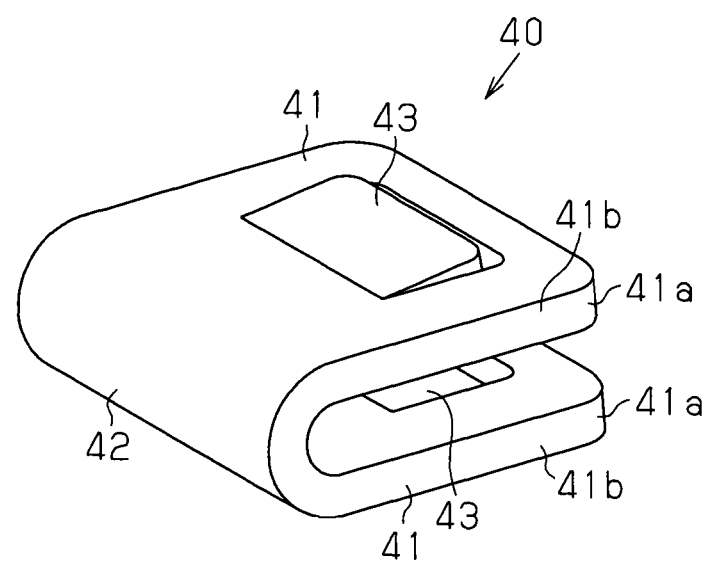
FIG. 7 is a perspective view which shows a latch member.
Figure 8A:
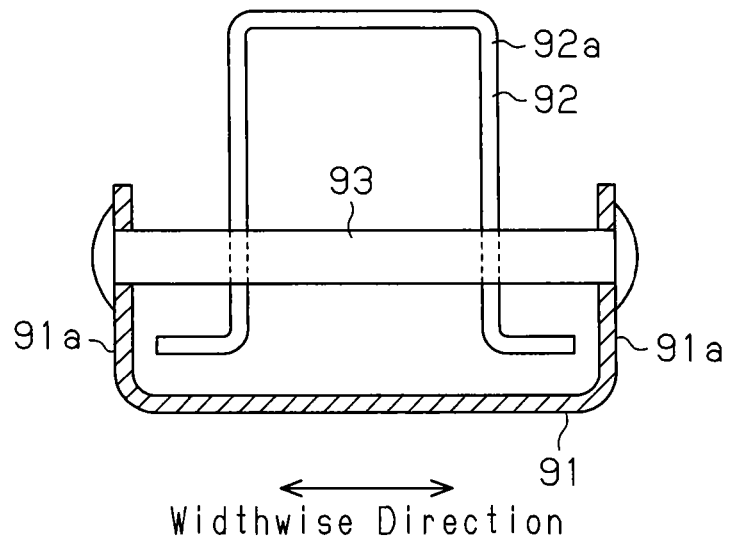
FIG. 8(a) is a transverse sectional view which shows a conventional mode schematically.
Figure 8B:
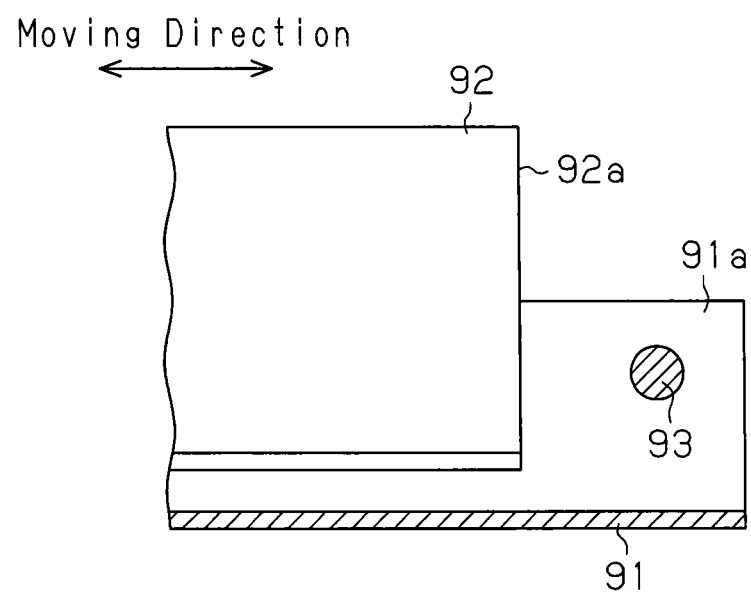
FIG. 8(b) is a longitudinal sectional view which shows a conventional mode schematically

A latch member 40 is inserted into the side wall part attachment hole 14a and the folded wall part attachment hole 16a adjacent to each other in the widthwise direction in a manner to bridge the second side wall part 14 and the second folded wall part 16 in the widthwise direction. As shown in FIG. 7, the latch member 40 is made of, for example, a blade spring prepared by folding a metal plate member into a U-shape. The latch member 40 is integrally provided with a pair of engagement pieces 41 which spread substantially parallel to each other and a substantially semi-cylindrical coupling part 42 for connecting the engagement pieces 41. At the center part of each engagement piece 41, there is formed a retaining part 43 which is cut and extended outward to be spaced away from each other, with the vicinity of the coupling part 42 given as a base end. In a state that the latch member 40 is able to move, a vertical distance between the end parts 41a of the engagement pieces 41 is set slightly larger than a vertical distance between both inner wall surfaces of the side wall part attachment holes 14a.

Figure 6:
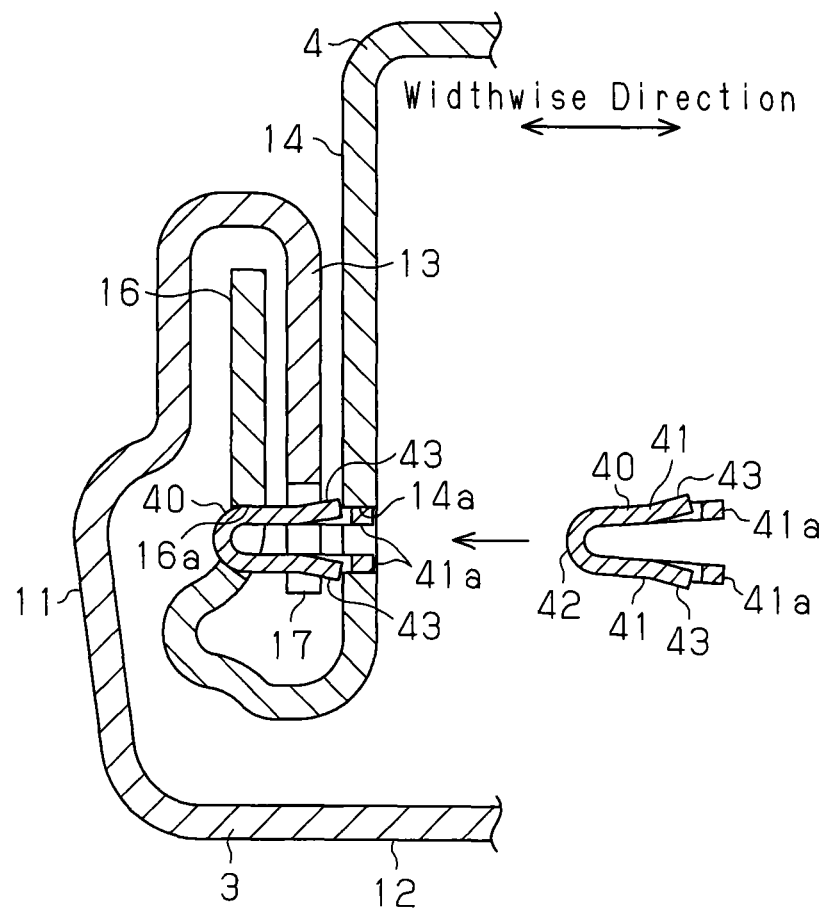
FIG. 6 is a sectional view which shows an assembly state of the same embodiment.

When the latch member 40 is assembled to the upper rail 4, the lower rail 3 and the upper rail 4 are assembled in advance so that the side wall part attachment hole 14a and the folded wall part attachment hole 16a are arranged between the restriction parts 17 in the longitudinal direction. As shown in FIG. 6, in this state, the latch member 40 is sequentially inserted into the side wall part attachment hole 14a and the folded wall part attachment hole 16a from inside the upper rail 4 outward in the widthwise direction. That is, the latch member 40 is sequentially inserted into the side wall part attachment hole 14a and the folded wall part attachment hole 16a, with the coupling part 42 kept ahead. At this time, the engagement pieces 41 or the retaining parts 43 are pressed to inner wall surface parts facing each other in the vertical direction which are inner wall surfaces of the side wall part attachment hole 14a, by which the latch member 40 undergoes elastic deformation so that the engagement pieces 41 are closed in this direction. Then, the coupling part 42 penetrates through the folded wall part attachment hole 16a and also the retaining parts 43 pass through the side wall part attachment hole 14a. Therefore, the retaining parts 43 are released from both vertical inner wall surfaces of the side wall part attachment hole 14a, by which the latch member 40 resumes elasticity to open the engagement pieces 41 in the vertical direction. At this time, each of the retaining parts 43 engages with an edge part of the side wall part attachment hole 14a in a direction reverse to an insertion direction into the side wall part attachment hole 14a (that is, inward in the widthwise direction), thereby the latch member 40 is suppressed from being detached from the upper rail 4. Accordingly, end parts 41a of the engagement pieces 41 are pressure-contacted to the vertical inner wall surfaces of the side wall part attachment hole 14a, by which the latch member 40 is retained on the upper rail 4.

Here, as a matter of course, the latch member 40 bridges the second side wall part 14 and the second folded wall part 16 in the widthwise direction opens a movement orbit of the first folded wall part 13, and cuts across a movement orbit of the restriction part 17 in a direction in which the lower rail 3 and the upper rail 4 make relative movement. Therefore, when the lower rail 3 and the upper rail 4 make relative movement, the corresponding restriction part 17 and the latch member 40 are brought into contact to restrict the movement. At this time, as shown in FIG. 3(a), the latch member 40 is in contact with the restriction part 17 on an end surface 41b in the back and forth direction thereof, that is, in a direction orthogonal to the vertical direction that is the thickness direction of the engagement pieces 41. Thereby, a distance of relative movement between the lower rail 3 and the upper rail 4 is restricted within a predetermined range.

As shown in FIG. 2, a circular shaft attachment hole 16b which is located further forward than the folded wall part attachment hole 16a on the front side is formed at each of the second folded wall parts 16 of the upper rail 4. A fan-shaped through hole 16c centering on the shaft attachment hole 16b in an intermediate part between the folded wall part attachment holes 16a is also formed at each of the second folded wall parts 16. A pair of slit-like supporting holes 21 which are arranged in the widthwise direction in parallel further forward than the shaft attachment hole 16b are formed on the second coupling wall part 15 of the upper rail 4. Both supporting holes 21 extend in the back and forth direction.

Further, as shown in FIG. 3(a), a circular shaft attachment hole 14b which is concentric with the shaft attachment hole 16b is formed at each of the second side wall parts 14 of the upper rail 4. Still further, a fan-shaped through hole 14c centering on the shaft attachment hole 14b in an intermediate part between the side wall part attachment holes 14a is formed at each of the second side wall parts 14. The shaft attachment holes 14b, 16b are mutually equal in inner diameter, and the through holes 14c, 16c are, as also shown in FIG. 4(b), mutually similar in opening shape and face in the widthwise direction.

As shown in FIG. 3(a), a lock lever 30 is coupled inside the upper rail 4 by a cylindrical support pin 22, which is a rotating shaft with a center line (axis) extending in the widthwise direction to rotate. That is, as shown in FIG. 2, the lock lever 30 is provided with a handgrip part 31 composed of a plate member extending in the back and forth direction. The handgrip part 31 is extended in such a manner that two vertical wall parts 32 (second supporting parts) are arranged in parallel in the widthwise direction all over the length thereof in the longitudinal direction. A distance between the vertical wall parts 32 in the widthwise direction is set smaller than a distance between the second side wall parts 14 of the upper rail 4 in the widthwise direction. Then, each of the vertical wall parts 32 is such that an upper end edge space is connected in the widthwise direction by a retention wall 33 at each of the front end parts and the upper end edge space is also connected in the widthwise direction by a top plate part 34 at each of the rear end parts. Then, a circular shaft attachment hole 35 which is concentric with the support pin 22 (shaft attachment holes 14b, 16b) is formed at each of the vertical wall parts 32. The support pins 22, the ends of which are inserted into the shaft attachment holes 14b, 16b, are inserted into and supported by the shaft attachment holes 35, by which the handgrip part 31 is coupled to the upper rail 4 to rotate.

It is noted that the retention wall 33 assumes a circular-arc shape which is raised downward when viewed laterally. Further, each of the vertical wall parts 32 is provided with a flange-shaped supporting wall 32a which protrudes internally in the widthwise direction and facing each other from a lower end edge between the retention wall 33 and the shaft attachment hole 35 in the back and forth direction.

A pair of joining parts 36 protrude at each of the vertical wall parts 32 downward from a lower end of the rear end part thereof which is below the top plate part 34, with an interval kept therebetween in the back and forth direction. Each of the joining parts 36 is configured so that a pair of joining pieces 36a, 36b arranged to be adjacent in the back and forth direction are given as one set. On the other hand, the lock lever 30 is provided with a flat-plate like lock plate 37 which spreads in the back and forth direction and in the widthwise direction in such a manner to penetrate through the through holes 14c, 16c. Four slit-like joining holes 38 which open in the vertical direction to face the respective joining parts 36 are formed on the lock plate 37. The lock plate 37 is joined and fixed to the handgrip part 31 by crimping the distal ends of the joining pieces 36a, 36b which penetrate through the joining hole 38, for example, to open in the back and forth direction after insertion of the joining part 36 into each of the joining holes 38.

Further, a plurality of lock holes 39 (three holes) which are arranged in parallel in the back and forth direction outward from the joining part 36 in the widthwise direction are formed on the lock plate 37, with the predetermined interval therebetween. As also shown in FIG. 4(b), each of the lock holes 39 is opened in the vertical direction to face the first folded wall part 13 and arranged at a position that can be in alignment with each of a plurality of lock pawls 13b (three pawls) adjacent in the longitudinal direction of the lower rail 3.

Then, as shown by the solid line in FIG. 4(b), when the lock lever 30 rotationally moves about the support pin 22 so that the lock plate 37 ascends, each of the lock holes 39 is able to accept a corresponding lock pawl 13b. When each of the lock holes 39 accepts the corresponding lock pawl 13b, restrictions are placed on relative movement between the lower rail 3 and the upper rail 4. On the other hand, as shown by the chain double-dashed line in FIG. 4(b), when the lock lever 30 rotationally moves about the support pin 22 so that the lock plate 37 descends, each of the lock holes 39 is detached from the corresponding lock pawl 13b. At this time, restrictions on relative movement between the lower rail 3 and the upper rail 4 are released.

Figure 5A:
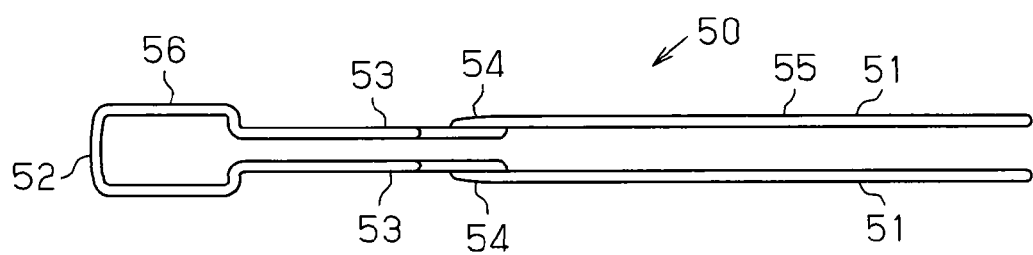
FIG. 5 (a) is a plan view which shows a wire spring.
FIG. 5(b) is a side view which shows a wire spring.
Figure 5B:
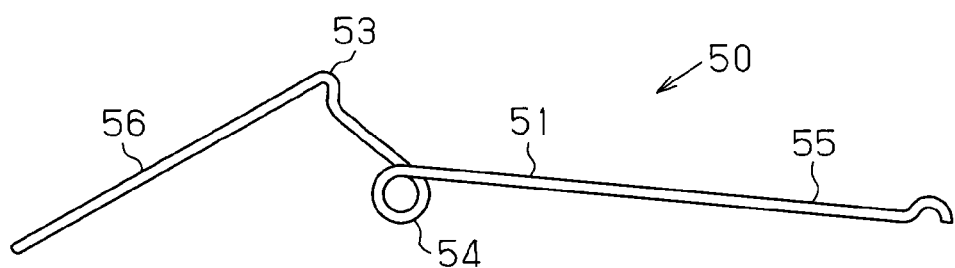

As shown in FIG. 2, a wire spring 50 composed of one linear element as an urging member is arranged inside the upper rail 4. As shown in FIG. 5(a), the wire spring 50 is substantially U-shaped and opened backward in a planar view. The wire spring 50 is provided with a pair of extension parts 51 which are symmetrical and extend in the back and forth direction and a connection part 52 which connects the front ends of the extension parts 51 in the widthwise direction. Further, as shown in FIG. 5(b), each of the extension parts 51 is provided with a fixing part 53 (latch part) at which an intermediate part in the longitudinal direction is curved out upward and also provided with a coil part 54 which is wound clockwise backward at the rear side of the fixing part 53. Then, the wire spring 50 configures a first urging part 55 at a site further backward than the fixing part 53 of each of the extension parts 51 including the coil part 54 and also forms a second urging part 56 at a site further forward than the connection part 52 and the fixing part 53 of each of the extension parts 51.

As shown in FIG. 3(a), the wire spring 50 is arranged substantially inside the handgrip part 31 in such a manner that each of the fixing parts 53 is allowed to protrude from a corresponding supporting hole 21 of the upper rail 4. Further, the coil part 54 is wound about the support pin 22, by which the wire spring 50 is supported by the upper rail 4 (the second side wall parts 14). The wire spring 50 is such that each of the fixing parts 53 is brought into contact with the rear end surface of the supporting hole 21, and the rear end part of the first urging part 55 is elastically brought into contact with the lower surface of the lock plate 37 further backward than the coil part 54 (support pin 22). That is, the first urging part 55 is subjected to bending deformation including the coil part 54, with a position which fixes the upper rail 4 (fixing part 53) given as a supporting point, and urging the lock lever 30 by using the fixing position as the supporting point. Therefore, the lock lever 30 is urged by the wire spring 50 (first urging part 55) to rotationally move in a direction in which the lock plate 37 ascends, that is, in a direction in which a lock pawl 13b corresponding to each lock hole 39 is fitted. The upper surface of the handgrip part 31 (top plate part 34) is brought into contact with the lower surface of the second coupling wall part 15, thereby placing restrictions on a rotational movement of the lock plate 37.

The coil part 54 is placed at the first urging part 55. This is because an elastic coefficient (spring constant) on bending deformation is practically reduced, while the extension length of the first urging part 55 is suppressed in the back and forth direction. The fixing parts 53 of the wire spring 50 are kept out of contact with the front end surface of the supporting hole 21.

Then, the connection part 52 of the wire spring 50 (second urging part 56) is arranged further forward than the retention wall 33.

The release handle 6 is made by bending a tubular member and formed to bridge the upper rails 4 at the front side thereof in the widthwise direction. As shown in FIG. 2, a distal end part 61 extending at the back of the release handle 6 assumes a cylindrical shape, the outer diameter of which is smaller than a distance between the vertical wall parts 32 in the widthwise direction. And, a slit-like supporting groove 62 extending in the widthwise direction is formed at the lower part of the distal end part 61.

As shown in FIG. 3(a), the release handle 6 is inserted below the retention wall 33 of the handgrip part 31 (lock lever 30) to which each of the distal end parts 61 corresponds and above the supporting walls 32a, that is, between the vertical wall parts 32. Then, the distal end part 61 is latched and retained by the connection part 52 of the wire spring 50 (the second urging part 56) which is fitted into the supporting groove 62. That is, the rear end surface 62a of the supporting groove 62 is given as an engagement surface with the connection part 52 for suppressing detachment of the distal end part 61 of the release handle 6. Further, the distal end part 61 inserted between the vertical wall parts 32 is arranged to face the support pin 22 on a backward extension line thereof. Thereby, even where the distal end part 61 is excessively inserted between the vertical wall parts 32, it is restricted to a predetermined range until the distal end part 61 is in contact with the support pin 22.

Then, the distal end part 61 inserted between the vertical wall parts 32 is urged on the supporting groove 62 by the wire spring 50 (second urging part 56) to ascend. Thereby, the distal end part 61 is retained to make an integral rotation with the lock lever 30 substantially about the support pin 22 in such a manner that upper and lower parts of the distal end part 61 are respectively brought into contact with a lower surface of the retention wall 33 and upper surfaces of the supporting walls 32a. That is, the wire spring 50 is also provided with functions to keep the release handle 6 elastically so that the release handle 6 makes an integral rotation with the lock lever 30. The distal end part 61 (release handle 6) is elastically retained at the connection part 52 of the wire spring 50. This is because, for example, the lock lever 30 is coupled, with an appropriate clearance kept. Alternatively, this is because when the distal end part 61 (release handle 6) tries to make rotational movement about the support pin 22 in a direction reverse to an original operating direction due to an unintended external force, etc., the distal end part 61 is allowed to sway with respect to the lock lever 30, thereby avoiding an excessively large load on the lock lever 30. Further, the connection part 52 of the wire spring 50 (second urging part 56) which latches the distal end part 61 of the release handle 6 is arranged further forward than the retention wall 33. This is because the release handle 6 is suppressed from swaying about the connection part 52 with respect to the lock lever 30.

Next, a description will be given of actions of the present embodiment.

First, the release handle 6 is assumed to be released from an operating force thereof. At this time, the wire spring 50 generates in association with bending deformation an urging force which urges the lock lever 30 in the vertical direction toward a direction in which the lock lever 30 engages with the lower rail 3. The lock lever 30 is allowed to rotationally move by an urging force of the wire spring 50 (the first urging part 55) in a direction in which the lock plate 37 ascends about the support pin 22 integrally with the distal end part 61 (release handle 6), that is, in a direction in which a corresponding lock pawl 13*b* is fitted into each of the lock holes 39. Thereby, restrictions are placed on relative movement between the lower rail 3 and the upper rail 4 in the above-described manner. Then, there is retained a position of the seat 5 which is supported by the upper rail 4 in the back and forth direction.

Here, the release handle 6 is assumed to be operated to raise a front end thereof. At this time, against the urging force of the wire spring 50 (the first urging part 55), the lock lever 30 is allowed to rotationally move integrally with the distal end part 61 (release handle 6) in a direction in which the lock plate 37 descends about the support pin 22, that is, to a side where each of the lock holes 39 is detached from a corresponding lock pawl 13*b*. Thereby, restrictions on relative movement between the lower rail 3 and the upper rail 4 are released in the above-described manner. Then, it is possible to adjust a position of the seat 5 supported by the upper rail 4 in the back and forth direction. As described so far, the wire spring 50 (the first urging part 55) is decreased in spring constant on bending deformation only by length of the coil part 54. Therefore, the release handle 6 is also decreased in operating force required for release operation at this time. In particular, when the upper rail 4 moves to the most forward position or the most backward position with respect to the corresponding lower rail 3, the restriction part 17 is brought into contact with the latch member 40 in the above-described manner, thereby restricting the movement. Accordingly, a distance of relative movement between the lower rail 3 and the upper rail 4 is restricted within a predetermined range. At this time, the latch member 40 is brought into contact with the restriction part 17 in a state of being supported by the upper rail 4 on both sides, thereby more securely restricting the movement. Specifically, the latch member 40 is supported on both sides by the second side wall parts 14 and the second folded wall parts 16 which are adjacent in the widthwise direction of the upper rail 4.

As so far described in detail, the present embodiment is able to provide the following effects.

(1) The lock lever 30 is urged in a vertical direction, that is, in a direction in which the lock lever 30 engages with the lower rail 3 by an urging force in association with bending deformation of the wire spring 50 (the first urging part 55). In this case, the effective length of the wire spring 50 in relation to a spring constant on bending deformation is determined by a length between a position latched to the second coupling wall part 15 (the fixing part 53, that is, the latch part) and the support pin 22 at the extension parts 51, a length between a position latched to the lock lever 30 (latch end part) and the support pin 22, and a length of the coil part 54. Therefore, a spring constant of the wire spring 50 on bending deformation can be decreased only by the length of the coil part 54. Thereby, it is possible to decrease the spring constant of the wire spring 50 on bending deformation without unnecessarily extending an end part of the wire spring 50 (the first urging part 55) from the support pin 22 to the second coupling wall part 15. Then, it is possible to suppress an increase in operating force required for disengaging the lock lever 30 from the lower rail 3, with restrictions on an arrangement space being decreased.

Further, the wire spring 50 is supported substantially by the upper rail 4 at two points, that is, at one end part which is latched to the second coupling wall part 15 (supporting hole 21) and at the support pin 22 which is wound about the coil part 54 at each of the extension parts 51. Therefore, the wire spring 50 can be made more stable in posture.

(2) Since the release handle 6 (distal end part 61) is retained to be elastically connected with respect to the lock lever 30 at the second urging part 56 of the wire spring 50, it can be connected, for example, with respect to the lock lever in appropriate moderation. Further, the second urging part 56 is arranged integrally with the wire spring 50. It is, therefore, possible to suppress an increase in the number of components, with the above-described functions added.

(3) The second urging part 56 is not in contact with the end surfaces (front end surfaces) of the supporting holes 21 of the upper rail 4 in the longitudinal direction. Therefore, the effective length of the second urging part 56 with regard to a spring constant on bending deformation is made longer, for example, than a case where the second urging part 56 is brought into contact with the end surfaces (front end surfaces) of the supporting holes 21 of the upper rail 4 in the longitudinal direction. It is, thus, possible to decrease the spring constant of the second urging part 56 on bending deformation.

(4) The support pin 22 faces on an extension line in a direction in which the lock lever 30 is inserted between the vertical wall parts 32. Thereby, even if the lock lever 30 is excessively inserted, the release handle 6 (distal end part 61) is able to be restricted in the insertion to a predetermined range until the release handle 6 is in contact with the support pin 22.

(5) The wire spring 50 can be formed by simply bending a single linear element.

(6) On relative movement between the lower rail 3 and the upper rail 4, the restriction part 17 and the latch member 40 are in contact with each other to restrict the relative movement. Thereby, a distance of relative movement between the lower rail 3 and the upper rail 4 is restricted within a predetermined range. When the latch member 40 is in contact with the restriction part 17, the latch member 40 supports the restriction part 17 in such a state to support the upper rail 4 (the second side wall parts 14 and the second folded wall parts 16) on both sides. Therefore, it is possible to more securely restrict the relative movement between the lower rail 3 and the upper rail 4. In particular, the latch member 40 can be arranged at any given position of the upper rail 4 in the longitudinal direction, as long as interference with peripheral components (such as the lock lever 30) can be avoided. It is, therefore, possible to increase the degree of freedom in terms of adjusting a range of restricting the distance of relative movement between the lower rail 3 and the upper rail 4.

(7) When assembled from inside to the upper rail 4, the latch member 40 can be easily assembled to the upper rail 4 by procedures in which the latch member 40 is inserted into the side wall part attachment hole 14*a* and the folded wall part attachment hole 16*a*, with elastic deformation carried out so that the end parts 41*a* are closed in the vertical direction, and the end parts 41*a* are pressure-contacted to the inner wall surfaces which face each other in the vertical direction of the side wall part attachment hole 14*a*.

(8) When the restriction part 17 and the latch member 40 are in contact with each other, the latch member 40 supports the restriction part 17 on the end surface 41*b* in a direction orthogonal to the thickness direction. Therefore, the latch member 40 is able to more securely restrict relative movement between the lower rail 3 and the upper rail 4 than a case where, for example, the restriction part 17 is supported in the thickness direction.

(9) The retaining part 43 engages with an edge part of the side wall part attachment hole 14*a* in a direction reverse to an insertion direction into the side wall part attachment hole 14*a* and the folded wall part attachment hole 16*a*. Thereby, the latch member 40 can be suppressed from being detached from the upper rail 4.

(10) There is eliminated a necessity for work of bending the upper rail 4 which is required in a conventional stopper structure in a step after assembly of the lower rail 3 and the upper rail 4.

It is noted that the above-described embodiment may be modified as follows.

It is acceptable that the wire spring 50 (the first and second urging parts 55, 56) is configured only with a single extension part 51.

It is acceptable that the wire spring 50 is formed with a linear element having a circular cross section or formed with a linear element having a rectangular cross section (what is called a band material).

It is acceptable that an urging member which urges the lock lever 30 and a member which retains the release handle 6 (the distal end part 61) are provided separately.

It is acceptable that the support pin 22 is supported by the lock lever 30 (the vertical wall parts 32), with the end parts thereof fixed to the upper rail 4 (the second side wall parts 14), or fixed to the lock lever 30 (the vertical wall parts 32), with the end parts thereof pivotally supported by the upper rail 4 (the second side wall parts 14).

It is acceptable that the lower rail 3 or the upper rail 4 is configured by a plurality of plate members that are connected by welding, etc.

It is acceptable that a relationship in which the lower rail 3 is fixed to the upper rail 4 and a relationship in which the vehicle floor 2 is fixed to the seat 5 (in other words, a vertical arrangement relationship) are reversed. In this case, it is acceptable that the release operation of the lock lever 30 arranged on the vehicle floor 2 side may be performed by using any suitable operating member such as a cable.

It is acceptable that the lower rail 3 and the upper rail 4 (seat sliding device for a vehicle) are in such a configuration that one each is placed or three or more each are placed with respect to the seat 5.

It is acceptable that in association with relative movement between the lower rail and the upper rail, the seat moves in the widthwise direction of the seat, for example.

It is acceptable that a retaining part of the latch member 40 is such that it engages with an edge part of the folded wall part attachment hole 16a, thereby suppressing detachment from the upper rail 4.

It is acceptable that the latch member 40 is assembled to the upper rail 4 to support the restriction part 17 on an end surface in the thickness direction.

It is acceptable that the latch member 40 to be arranged on the upper rail 4 is provided solely on one side of the upper rail 4 in the widthwise direction.

It is acceptable that the restriction part 17 and the latch member 40 are placed only on one side of each of the lower rail 3 and the upper rail 4 in the widthwise direction.

It is acceptable that the restriction part 17 is arranged at an intermediate part of the lower rail 3 (the first folded wall part 13) in the longitudinal direction and also the latch member 40 is arranged at both end parts of the upper rail 4 in the longitudinal direction. In this case, it is acceptable that the restriction part 17 arranged on one side of the lower rail 3 in the widthwise direction is provided solely or in a pair arranged in the longitudinal direction, with an interval kept therebetween.

It is acceptable that the latch member is a flat and plate-like or a wedge-like latch member in which both end parts thereof are press-fitted or welded into the side wall part attachment hole 14a and the folded wall part attachment hole 16a mutually adjacent in the widthwise direction and bridging the second side wall part 14 and the second folded wall part 16.

DESCRIPTION OF REFERENCE NUMERALS

2 . . . vehicle floor, 3 . . . lower rail (first rail), 4 . . . upper rail (second rail), 5 . . . sheet, 6 . . . release handle (operating member), 11 . . . first side wall part, 13 . . . first folded wall part, 14 . . . second side wall part (side wall part, first supporting part), 14a . . . side wall part attachment hole, 15 . . . second coupling wall part (coupling wall part, coupling part), 16 . . . second folded wall part, 16a . . . folded wall part attachment hole, 17 . . . restriction part, 21 . . . supporting hole, 22 . . . support pin (rotating shaft), 30 . . . lock lever, 31 . . . handgrip part, 32 . . . vertical wall part (second supporting part), 37 . . . lock plate, 40 . . . latch member, 41 . . . engagement piece, 41a . . . end part, 41b . . . end surface, 42 . . . coupling part, 43 . . . retaining part, 50 . . . wire spring (urging member), 54 . . . coil part, 55 . . . first urging part, 56 . . . second urging part (urging part)

The invention claimed is:

1. A seat sliding device for a vehicle comprising:
a first rail, which is adapted to be fixed to one of a vehicle floor and a seat;
a second rail, which is adapted to be fixed to the other one of the vehicle floor and the seat and coupled to the first rail to make a relative movement with respect to the first rail, wherein the second rail has a pair of side wall parts arranged in a widthwise direction in parallel and a coupling wall part, which couples base ends of the side wall parts in which the base ends of the side wall parts are spaced away from the first rail;
a rotating shaft, which has an axis extending in the widthwise direction and which bridges the side wall parts;
a lock lever, which has a pair of vertical wall parts that are arranged in parallel between the side wall parts in the widthwise direction and through which the rotating shaft penetrates, wherein the lock lever rotationally moves about the axis in one direction to engage with the first rail, thereby restricting relative movement between the first rail and the second rail and rotationally moves about the axis in the other direction to release the engagement with the first rail, thereby releasing restrictions on the relative movement; and
an urging member, which has a latch part latched to the coupling wall part and a latch end part latched to the lock lever, wherein the urging member generates in association with bending deformation an urging force that urges the lock lever in a vertical direction in which the lock lever engages with the first rail, wherein
the urging member has a coil part, which is wound about the rotating shaft between the latch part and the latch end part,
an operating member is connected to the lock lever to transmit an operating force for releasing restrictions on the relative movement to the lock lever, and
the urging member is integrally provided with an urging part which is extended from the latch part and latched to the operating member, thereby elastically retaining a state that the operating member is connected with respect to the lock lever.

2. The seat sliding device for a vehicle according to claim 1, wherein
the latch part of the urging member is inserted into a supporting hole formed at the coupling wall part and latched to the coupling wall part in a state of being in contact with one end surface of the supporting hole of the second rail in the longitudinal direction, and the urging part is not in contact with any given end surface of the supporting hole of the second rail in the longitudinal direction.

3. The seat sliding device for a vehicle according to claim 1, wherein the operating member is inserted between the vertical wall parts, and the operating member faces the rotating shaft on an extension line in a direction in which the operating member is inserted between the vertical wall parts.

4. The seat sliding device for a vehicle according to claim 1, wherein the urging member is a wire spring composed of a single linear element.

5. A seat sliding device for a vehicle which is installed on a vehicle having a floor and a seat, comprising:

a first rail, which is adapted to be fixed to one of the floor and the seat; and a second rail, which is adapted to be fixed to the other one of the floor and the seat and coupled to the first rail to make relative movement with respect to the first rail, wherein the first rail is provided with a pair of first side wall parts arranged in a widthwise direction in parallel, two first folded wall parts, which individually extend inward in the widthwise direction facing each other and extend from distal ends of the first side wall parts and folded toward base ends of the first side wall parts, and a restriction part further extending from a distal end of each of the first folded parts at a predetermined position of the first rail in a longitudinal direction, and the second rail is provided with a pair of second side wall parts arranged in parallel between the first side wall parts in the widthwise direction, two second folded wall parts extending individually outward in the widthwise direction mutually spaced away from distal ends of the second side wall parts and folded to be enclosed with the first side wall parts and the first folded wall parts, and a side wall part attachment hole and a folded wall part attachment hole, which are formed to respectively face in the widthwise direction where the second side wall parts and the second folded wall parts are adjacent, wherein the side wall part attachment hole and a folded wall part attachment hole are located at a predetermined position of the second rail in the longitudinal direction, and the seat sliding device for a vehicle is provided with a latch member, which is inserted into the side wall part attachment hole and the folded wall part attachment hole to bridge the second side wall parts and the second folded wall parts in the widthwise direction, that enables the relative movement between the first and the second rail within a predetermined range.

6. The seat sliding device for a vehicle according to claim 5, wherein an inner wall surface of the side wall part attachment hole or that of the folded wall part attachment hole has an inner wall surface part facing in one direction, and the latch member is a blade spring folded, wherein the latch member has opposing end parts which are pressure-contacted with the inner wall surface part.

7. The seat sliding device for a vehicle according to claim 5, wherein the latch member is composed of a plate member and able to be in contact with the restriction part on an end surface in a direction orthogonal to a thickness direction thereof.

8. The seat sliding device for a vehicle according to claim 5, wherein the latch member is provided with a retaining part which is cut and extended to engage with an edge part of the side wall part attachment hole or that of the folded wall part attachment hole in a direction reverse to an insertion direction into the side wall part attachment hole and the folded wall part attachment hole.

9. The seat sliding device for a vehicle according to claim 2, wherein the operating member is inserted between the vertical wall parts, and the operating member faces the rotating shaft on an extension line in a direction in which the operating member is inserted between the vertical wall parts.

10. The seat sliding device for a vehicle according to claim 6, wherein the latch member is composed of a plate member and able to be in contact with the restriction part on an end surface in a direction orthogonal to a thickness direction thereof.

11. The seat sliding device for a vehicle according to claim 6, wherein the latch member is provided with a retaining part which is cut and extended to engage with an edge part of the side wall part attachment hole or that of the folded wall part attachment hole in a direction reverse to an insertion direction into the side wall part attachment hole and the folded wall part attachment hole.

* * * * *